(12) United States Patent
Agiomyrgiannakis et al.

(10) Patent No.: US 9,613,620 B2
(45) Date of Patent: Apr. 4, 2017

(54) METHODS AND SYSTEMS FOR VOICE CONVERSION

(71) Applicant: Google Inc., Mountain View, CA (US)

(72) Inventors: Ioannis Agiomyrgiannakis, London (GB); Zoi Roupakia, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/631,464

(22) Filed: Feb. 25, 2015

(65) Prior Publication Data

US 2016/0005403 A1 Jan. 7, 2016

Related U.S. Application Data

(60) Provisional application No. 62/020,812, filed on Jul. 3, 2014.

(51) Int. Cl.
*G10L 21/013* (2013.01)
*G10L 25/75* (2013.01)
(Continued)

(52) U.S. Cl.
CPC .............. *G10L 15/07* (2013.01); *G10L 17/06* (2013.01); *G10L 25/75* (2013.01); *G10L 2021/0135* (2013.01)

(58) Field of Classification Search
CPC ... G10L 21/003; G10L 21/007; G10L 21/013; G10L 2021/0135; G10L 25/75
(Continued)

(56) References Cited

U.S. PATENT DOCUMENTS 6,615,174 B1 * 9/2003 Arslan .................. G10L 13/033
704/217
8,010,362 B2 8/2011 Tamura et al.
(Continued)

FOREIGN PATENT DOCUMENTS

KR WO 2008018653 A1 * 2/2008 ........... G01L 13/033

OTHER PUBLICATIONS

Cabral, Joao P. "HMM-based speech synthesis using an acoustic glottal source model." Doctoral Thesis, pp. 1-350.*
(Continued)

*Primary Examiner* — James Wozniak
(74) *Attorney, Agent, or Firm* — McDonnell Boehnen Hulbert & Berghoff LLP

(57) ABSTRACT

A device may receive data indicative of a plurality of speech sounds associated with first voice characteristics of a first voice. The device may receive an input indicative of speech associated with second voice characteristics of a second voice. The device may map at least one portion of the speech of the second voice to one or more speech sounds of the plurality of speech sounds of the first voice. The device may compare the first voice characteristics with the second voice characteristics based on the map. The comparison may include vocal tract characteristics, nasal cavity characteristics, and voicing characteristics. The device may determine a given representation configured to associate the first voice characteristics with the second voice characteristics. The device may provide an output indicative of pronunciations of the one or more speech sounds of the first voice according to the second voice characteristics based on the given representation.

18 Claims, 6 Drawing Sheets

(51) Int. Cl.
  *G10L 15/07* (2013.01)
  *G10L 17/06* (2013.01)
(58) Field of Classification Search
  USPC .............................. 704/258, 260, 261, 270
  See application file for complete search history.

(56) References Cited

U.S. PATENT DOCUMENTS

| | | | |
|---|---|---|---|
| 8,099,282 B2 | 1/2012 | Masuda | |
| 8,234,110 B2 | 7/2012 | Meng et al. | |
| 8,255,222 B2* | 8/2012 | Hirose | G10L 13/04 704/261 |
| 8,438,033 B2 | 5/2013 | Tamura et al. | |
| 8,768,704 B1* | 7/2014 | Fructuoso | G10L 13/086 704/2 |
| 2003/0215085 A1* | 11/2003 | Bonnard | G10L 19/00 379/387.02 |
| 2010/0049522 A1* | 2/2010 | Tamura | G10L 13/033 704/264 |
| 2010/0198600 A1* | 8/2010 | Masuda | G10L 13/033 704/278 |
| 2010/0235166 A1* | 9/2010 | Bardino | G10L 21/04 704/207 |
| 2011/0282668 A1* | 11/2011 | Stefan | G10L 13/033 704/260 |
| 2012/0253781 A1* | 10/2012 | Qian | G10L 21/003 704/2 |
| 2013/0311189 A1* | 11/2013 | Villavicencio | G10L 13/033 704/268 |
| 2014/0108015 A1 | 4/2014 | Ryu et al. | |
| 2015/0127349 A1* | 5/2015 | Agiomyrgiannakis | G10L 15/142 704/266 |
| 2015/0127350 A1* | 5/2015 | Agiomyrgiannakis | G10L 13/02 704/266 |

OTHER PUBLICATIONS d'Alessandro, et al. "Experiments in voice quality modification of natural speech signals: the spectral approach." The Third ESCA/COCOSDA Workshop (ETRW) on Speech Synthesis. Nov. 1998, pp. 1-7.*
Degottex, Gilles, et al. "Mixed source model and its adapted vocal tract filter estimate for voice transformation and synthesis." Speech Communication 55.2, Feb. 2013, pp. 278-294.*
Farner, et al. "Natural transformation of type and nature of the voice for extending vocal repertoire in high-fidelity applications." Audio Engineering Society Conference: 35th International Conference: Audio for Games. Audio Engineering Society, Feb. 2009, pp. 1-10.*
Godoy, et al. "Voice conversion using dynamic frequency warping with amplitude scaling, for parallel or nonparallel corpora." Audio, Speech, and Language Processing, IEEE Transactions on 20.4, May 2012, pp. 1313-1323.*
Machado, Anderson F., and Marcelo Queiroz. "Voice conversion: A critical survey." Proc. Sound and Music Computing (SMC), 2010, pp. 1-8.*
Mizuno, et al. "Voice conversion based on piecewise linear conversion rules of formant frequency and spectrum tilt." Acoustics, Speech, and Signal Processing, 1994. ICASSP-94., 1994 IEEE International Conference on. vol. 1. IEEE, Apr. 1994, pp. 469-472.*
Narendranath, M. "Transformation of Vocal Tract Characteristics for Voice Conversion using Artificial Neural Networks." Nov. 1995, pp. 1-89.*
Přibilová, et al. "Non-linear frequency scale mapping for voice conversion in text-to-speech system with cepstral description." Speech Communication 48.12, Dec. 2006, pp. 1691-1703.*
Qiao, Yu, Daisuke Saito, and Nobuaki Minematsu. "HMM-based sequence-to-frame mapping for voice conversion." Acoustics Speech and Signal Processing (ICASSP), 2010 IEEE International Conference on. IEEE, Mar. 2010, pp. 4830-4833.*
Qin, Long, et al. "An Improved Spectral and Prosodic Transformation Method in Straight-based Voice Conversion." ICASSP (1). Apr. 2005, pp. 21-24.*
Raitio, Tuomo, et al. "HMM-based speech synthesis utilizing glottal inverse filtering." Audio, Speech, and Language Processing, IEEE Transactions on19.1, Jan. 2011, pp. 153-165.*
Rao, et al. "Voice conversion by prosody and vocal tract modification." Information Technology, 2006. ICIT'06. 9th International Conference on. IEEE, Dec. 2006, pp. 111-116.*
Rentzos, et al. "Voice Profile: A Structured Probability Model with Application to Voice Morphing." ODYSSEY04—The Speaker and Language Recognition Workshop. Jun. 2004, pp. 1-6.*
Shuang, Zhi-Wei, et al. "A novel voice conversion system based on codebook mapping with phoneme-tied weighting." Proc. ICSLP, Jeju, Oct. 2004, pp. 1-4.*
Xia, Jing, and Junxun Yin. "A GMM based residual prediction method for voice conversion." Intelligent Signal Processing and Communication Systems, 2005. ISPACS 2005. Proceedings of 2005 International Symposium on. IEEE, Dec. 2005, pp. 389-392.*
Yang, et al. "Estimation of voice source and vocal tract parameters using combined subspace-based and amplitude spectrum-based algorithm." ICSLP. Dec. 1998, pp. 1-4.*
Dutoit, Thierry, et al. "Towards a voice conversion system based on frame selection." Acoustics, Speech and Signal Processing, 2007. ICASSP 2007. IEEE International Conference on. vol. 4. IEEE, Apr. 2007, pp. 513-516.*
Stylianou, Yannis, et al. "Continuous probabilistic transform for voice conversion." Speech and Audio Processing, IEEE Transactions on 6.2, Mar. 1998, pp. 131-142.*
Erro, et al. "Weighted frequency warping for voice conversion." Interspeech 2007, Aug. 2007, pp. 1-4.*
Erro, et al. "Parametric voice conversion based on bilinear frequency warping plus amplitude scaling." IEEE Transactions on Audio, Speech, and Language Processing 21.3, Mar. 2013, pp. 556-566.*
Zorila et al., "Towards a Robust Dynamic Frequency Warping Text-Independent Voice Conversion System," Iber Speech 2012, pp. 143-152.
Tokuda et al., "Mel-Generalized Cepstral Analysis a Unified Approach to Speech Spectral Estimation," Department of Electrical and Electronic Engineering, Tokyo Institute of Technology, Tokyo, 152 Japan, Precision and Intelligence Laboratory, Tokyo Institute of Technology, Yokohama, 227 Japan.
Nakashika et al., "Voice Conversion in High-Order Eigen Space Using Deep Belief Nets," Interspeech, Aug. 25-29 Lyon, France, pp. 369-372.
D'haes et al., "Discrete Cepstrum Coefficients as Perceptual Features," Visionlab—University of antwerp—Groenenborgerlaan 171—2020 Antwerp—Belgium.
Toda et al., "One-To-Many and Many-To-One Voice Conversion Based on Eigenvoices," Graduate School of Information Science, Nara Institute of Science and Technology, Japan, IEEE, ICASSP 2007, pp. IV-1249-IV-1252.
Valbret et al., "Voice Transformation Using Psola Technique," Telecom Paris, Dept. Signal, CNRS-URA 820, IEEE 1992, pp. I-145-I-148.
Gody et al., "Voice Conversion Using Dynamic Frequency Warping With Amplitude Scaling, for Parallel or Nonparallel Corpora," IEEE Transactions on Audio Speech, and Language Processing, vol. 20, No. 4, May 2012, pp. 1313-1323.
Erro et al., "INCA Algorithm for Training Voice Conversion Systems From Nonparallel Corpora," IEEE Transactions on Audio Speech and Language Processing, vol. 18, No. 5, Jul. 2010, pp. 944-953.
Erro et al., "Voice Conversion Based on Weighted Frequency Warping," IEEE Transactions on Augio Speech and Language Processing, vol. 18, No. 5, Jul. 2010, pp. 922-931.
Ye et al., "Voice Conversion for Unknown Speakers," Cambridge University Engineering Department, Trumpington St. Cambridge, England, CB2 1PZ.

(56) References Cited

OTHER PUBLICATIONS

Ye et al., "Perceptually Weighted Linear Transformations for Voice Conversion," Cambridge University Engineering Department, Trumpington St. Cambridge, England, CB2 1PZ.

* cited by examiner

METHODS AND SYSTEMS FOR VOICE CONVERSION

CROSS-REFERENCE TO RELATED APPLICATION

This application claims priority to U.S. Provisional Patent Application Ser. No. 62/020,812, filed on Jul. 3, 2014, the entirety of which is herein incorporated by reference.

BACKGROUND

Unless otherwise indicated herein, the materials described in this section are not prior art to the claims in this application and are not admitted to be prior art by inclusion in this section.

Voice conversion systems are speech processing systems configured to alter speech from a first speaker to have voice characteristics of a second speaker. By way of example, a text-to-speech (TTS) device may be employed to generate synthetic speech from text by concatenating one or more recorded speech sounds from the first speaker. Such TTS, for example, may utilize a voice conversion system to modify the one or more recorded speech sounds to have the voice characteristics of the second speaker. In this example, the synthetic speech may be perceived as speech from the second speaker.

SUMMARY

In one example, a method is provided that includes a device receiving data indicative of a plurality of speech sounds associated with first voice characteristics of a first voice. The device may include one or more processors. The method also includes receiving an input indicative of speech associated with second voice characteristics of a second voice. The method also includes mapping at least one portion of the speech of the second voice to one or more speech sounds of the plurality of speech sounds of the first voice. The method also includes comparing the first voice characteristics with the second voice characteristics based on the mapping. The comparison may include vocal tract characteristics, nasal cavity characteristics, and voicing characteristics. The voicing characteristics may be associated with a glottal format or a spectral tilt. The spectral tilt may be between spectral features of a first speech sound of the first voice and corresponding spectral features of a second speech sound of the second voice. The method also includes determining a given representation configured to associate the first voice characteristics with the second voice characteristics based on the comparison. The method also includes providing an output indicative of pronunciations of the one or more speech sounds of the first voice according to the second voice characteristics of the second voice based on the given representation.

In another example, a method is provided that includes a device receiving data indicative of a plurality of speech sounds associated with first voice characteristics of a first voice. The method also includes receiving a request for provision of speech content. The request may be indicative of the speech content having second voice characteristics of a second voice. The method also includes determining a sequence of speech sounds that corresponds to the speech content indicated by the request from within the plurality of speech sounds of the first voice. The method also includes receiving a plurality of representations configured to associate the first voice characteristics with the second voice characteristics. The plurality of representations may be indicative of a comparison between the first voice characteristics and the second voice characteristics. The comparison may include vocal tract characteristics, nasal cavity characteristics, and voicing characteristics. The voicing characteristics may be associated with a glottal formant or a spectral tilt. The spectral tilt may be between spectral features of the first voice characteristics and corresponding spectral features of the second voice characteristics. The method also includes modifying the sequence of speech sounds of the first voice to have the second voice characteristics of the second voice based on the plurality of representations. The method also includes providing the speech content having the second voice characteristics of the second voice based on the modification.

In yet another example, a device is provided that comprises one or more processors and data storage configured to store instructions executable by the one or more processors. The instructions may cause the device to receive data indicative of a plurality of speech sounds associated with first voice characteristics of a first voice. The instructions may also cause the device to receive an input indicative of speech associated with second voice characteristics of a second voice. The instructions may also cause the device to map at least one portion of the speech of the second voice to one or more speech sounds of the plurality of speech sounds of the first voice. The instructions may also cause the device to compare the first voice characteristics with the second voice characteristics based on the map. The comparison may include vocal tract characteristics, nasal cavity characteristics, and voicing characteristics. The voicing characteristics may be associated with a glottal formant or a spectral tilt. The spectral tilt may be between spectral features of a first speech sound of the first voice and corresponding spectral features of a second speech sound of the second voice. The instructions may also cause the device to determine a given representation configured to associate the first voice characteristics with the second voice characteristics based on the comparison. The instructions may also cause the device to provide an output indicative of pronunciations of the one or more speech sounds of the first voice according to the second voice characteristics of the second voice based on the given representation.

In still another example, a system is provided that comprises a means for a device receiving data indicative of a plurality of speech sounds associated with first voice characteristics of a first voice. The device may include one or more processors. The system further comprises a means for receiving an input indicative of speech associated with second voice characteristics of a second voice. The system further comprises a means for mapping at least one portion of the speech of the second voice to one or more speech sounds of the plurality of speech sounds of the first voice. The system further comprises a means for comparing the first voice characteristics with the second voice characteristics based on the mapping. The comparison may include vocal tract characteristics, nasal cavity characteristics, and voicing characteristics. The voicing characteristics may be associated with a glottal formant or a spectral tilt. The spectral tilt may be between spectral features of a first speech sound of the first voice and corresponding spectral features of a second speech sound of the second voice. The system further comprises a means for determining a given representation configured to associate the first voice characteristics with the second voice characteristics based on the comparison. The system further comprises a means for providing an output indicative of pronunciations of the one or more speech sounds of the first voice according to the second voice characteristics of the second voice based on the given representation.

In still another example, a system is provided that comprises a means for receiving data indicative of a plurality of speech sounds associated with first voice characteristics of a first voice. The system further comprises a means for receiving a request for provision of speech content. The request may be indicative of the speech content having second voice characteristics of a second voice. The system further comprises a means for determining a sequence of speech sounds that corresponds to the speech content indicated by the request from within the plurality of speech sounds of the first voice. The system further comprises a means for receiving a plurality of representations configured to associate the first voice characteristics with the second voice characteristics. The plurality of representations may be indicative of a comparison between the first voice characteristics and the second voice characteristics. The comparison may include vocal tract characteristics, nasal cavity characteristics, and voicing characteristics. The voicing characteristics may be associated with a glottal formant or a spectral tilt. The spectral tilt may be between spectral features of the first voice characteristics and corresponding spectral features of the second voice characteristics. The system further comprises a means for modifying the sequence of speech sounds of the first voice to have the second voice characteristics of the second voice based on the plurality of representations. The system further comprises a means for providing the speech content having the second voice characteristics of the second voice based on the modification.

These as well as other aspects, advantages, and alternatives, will become apparent to those of ordinary skill in the art by reading the following detailed description, with reference where appropriate to the accompanying figures.

DETAILED DESCRIPTION

Figure 1:
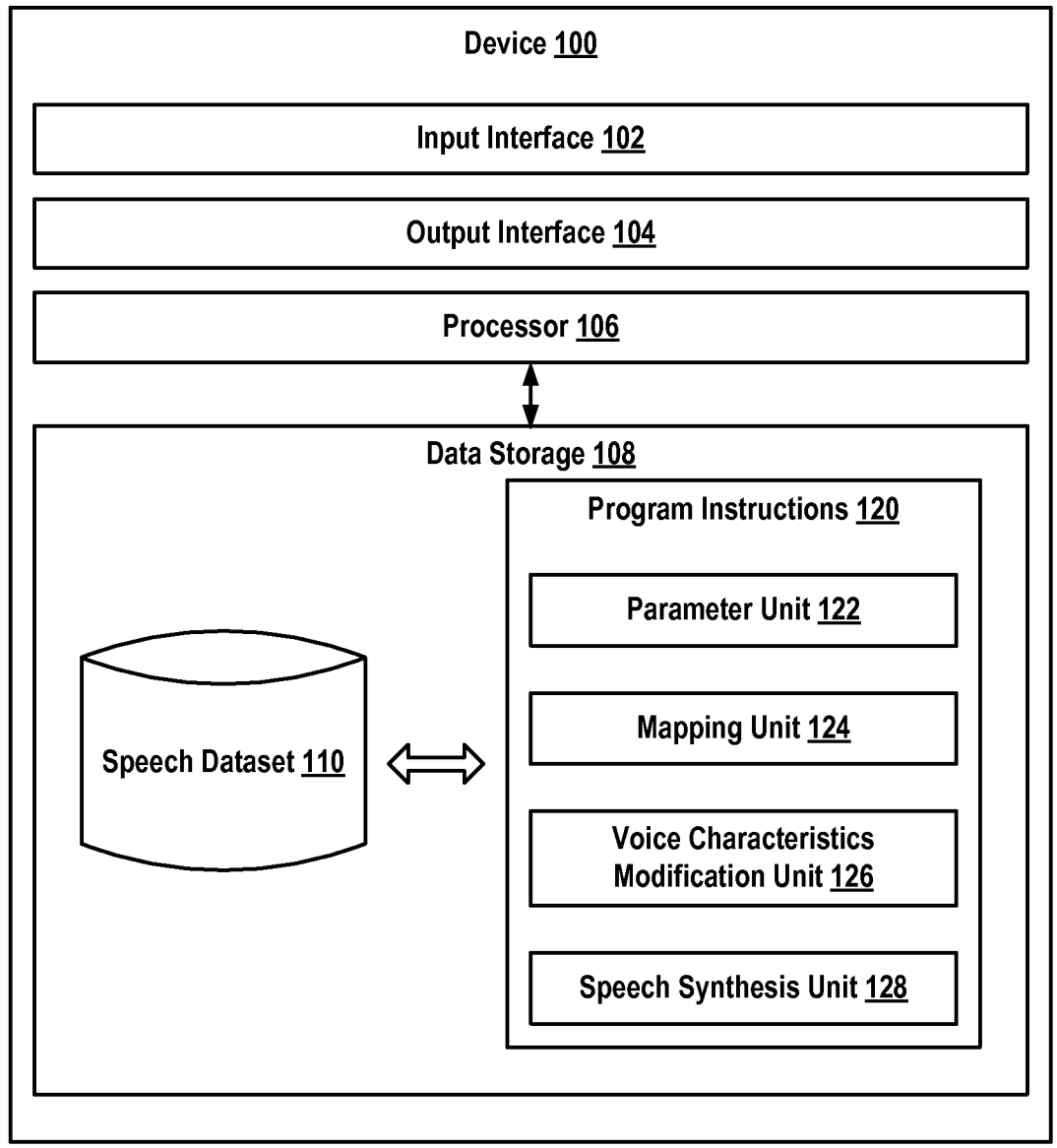
FIG. 1 illustrates an example device, in accordance with at least some embodiments described herein.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Speech processing systems such as text-to-speech (TTS) systems, automatic speech recognition (ASR) systems, vocoder systems, etc., may be deployed in various environments to provide speech-based user interfaces or other speech-based output. Some of these environments may include residences, businesses, vehicles, etc. To facilitate speech synthesis in such systems, a speech corpus may be provided that includes recorded speech from a speaker that has a particular voice (e.g., male, female, child, adult, high-pitch, low-pitch, etc.), or the speech corpus may include representations of the recorded speech (e.g., parametric representations, etc.).

In some instances, a speech synthesis system may be configured to provide synthetic speech associated with more than one voice. For instance, a TTS may provide synthetic speech having the particular voice for a first application (e.g., email, etc.) and synthetic speech having another voice for a second application (e.g., calendar, etc.). In some examples, the TTS may include a speech corpus for each voice to provide such functionality. However, in other examples, including multiple speech corpuses may be undesirable. In one example, memory limitations may only allow a limited number of speech corpuses. In another example, a speech corpus for a desired voice may be unavailable. For example, a device may be configured to provide synthetic speech associated with a given voice that was unknown when the speech corpus was generated.

Accordingly, in some examples, a voice conversion system may be employed for speech synthesis to allow converting first voice characteristics of recorded speech (or representations thereof) of a first voice to second voice characteristics associated with a second voice. For example, the voice conversion system may apply various signal processing techniques (e.g., filters, transforms, etc.) to adjust the first voice characteristics of the recorded speech to correspond to the second voice characteristics associated with the second voice. In some examples, the first voice may correspond to the linguistics term "source voice" or "source speaker," and the second voice may correspond to the linguistic term "target voice" or "target speaker."

In some examples, such voice conversion system may be configured to associate the first voice characteristics with the second voice characteristics based on a comparison between speech sounds associated with the first voice and speech sounds associated with the second voice. However, in some scenarios, there may be limitations for the comparison of the voice conversion system. Example limitations may include an amount of training data available (e.g., first voice speech sounds, second voice speech sounds, etc.), speed requirements of the comparison according to the voice conversion application, etc.

Therefore, within examples, systems, devices, and methods are provided for fast voice conversion that is compatible with limited training data. In one example, a device is provided that is configured to receive data indicative of a plurality of speech sounds associated with first voice characteristics of a first voice. The device may also be configured to receive input indicative of speech associated with second voice characteristics of a second voice. The device may also be configured to map at least one portion of the speech of the second voice to one or more speech sounds of the plurality of speech sounds of the first voice. Various techniques for the mapping in accordance with speed requirements of the comparison are possible and are described in greater detail within embodiments of the present disclosure.

The device may also be configured to compare the first voice characteristics with the second voice characteristics based on the mapping. The comparison may include vocal tract characteristics, nasal cavity characteristics, and voicing characteristics. By way of example, the device may compensate for difference in the vocal tract characteristics using a signal processing technique such as frequency warping. Further, for example, the device may compensate for difference in the nasal cavity characteristics (and/or the voicing characteristics) using a signal processing technique such as frequency weighting. In some examples, the device may be configured to perform the comparison between the voice characteristics simultaneously (e.g., simultaneous frequency warping and frequency weighting, etc.). In turn, for example, such implementation may allow the comparison to be both fast and compatible with a limited amount of speech sounds associated with the second voice.

The device may also be configured to determine a given representation for associating the first voice characteristics with the second voice characteristics based on the comparison. For example, the device may determine a frequency warping and weighting filter (e.g., the given representation) that associates the first voice characteristics with the second voice characteristics. The device may also be configured to provide an output indicative of pronunciations of the one or more speech sounds of the first voice according to the second voice characteristics of the second voice based on the given representation.

Some embodiments herein may therefore allow "online" voice conversion. Within examples, "online" voice conversion may correspond to voice conversion training and implementation during the speech synthesis process such as, for example, a computing device receiving speech input from a user and responsively providing synthetic speech having voice characteristics of the user (e.g., speech translation, etc.). In other embodiments, systems and methods herein may also allow "offline" voice conversion that is compatible with limited training data. As an example of "offline" voice conversion, a user of an example device may provide a few utterances of speech associated with a first voice, and the example device may update a speech corpus associated with a second voice to have voice characteristics of the first voice. Other examples are possible as well and are described in greater detail within embodiments of the present disclosure.

Referring now to the figures, FIG. 1 illustrates an example device 100, in accordance with at least some embodiments described herein. The device 100 includes an input interface 102, an output interface 104, a processor 106, and data storage 108.

The device 100 may include a computing device such as a smart phone, digital assistant, digital electronic device, body-mounted computing device, personal computer, server, or any other computing device configured to execute program instructions 120 included in the data storage 108 to operate the device 100. The device 100 may include additional components (not shown in FIG. 1), such as a camera, an antenna, or any other physical component configured, based on the program instructions 120 executable by the processor 106, to operate the device 100. The processor 106 included in the device 100 may comprise one or more processors configured to execute the program instructions 120 to operate the device 100.

The input interface 102 may include an audio input device such as a microphone or any other component configured to provide an input signal comprising audio content associated with speech to the processor 106. Additionally or alternatively, the input interface 102 may include a text input device such as a keyboard, mouse, touchscreen, or any other component configured to provide an input signal comprising text content and or other linguistic content (e.g., phonemic content, etc.) to the processor 106.

The output interface 104 may include an audio output device, such as a speaker, headphone, or any other component configured to receive an output signal from the processor 106, and output speech sounds that may indicate synthetic speech content based on the output signal. Additionally or alternatively, the output interface 104 may include a display such as a liquid crystal display (LCD), light emitting diode (LED) display, projection display, cathode ray tube (CRT) display, or any other display configured to provide the output signal comprising linguistic content (e.g., text).

Additionally or alternatively, the input interface 102 and/or the output interface 104 may include network interface components configured to, respectively, receive and/or transmit the input signal and/or the output signal described above. For example, an external computing device (e.g., server, etc.) may provide the input signal (e.g., speech content, linguistic content, etc.) to the input interface 102 via a communication medium such as Wi-Fi, WiMAX, Ethernet, Universal Serial Bus (USB), or any other wired or wireless medium. Similarly, for example, the external computing device may receive the output signal from the output interface 104 via the communication medium described above.

The data storage 108 may include one or more memories (e.g., flash memory, Random Access Memory (RAM), solid state drive, disk drive, etc.) that include software components configured to provide the program instructions 120 executable by the processor 106 to operate the device 100. Although FIG. 1 shows the data storage 108 physically included in the device 100, in some examples, the data storage 108 or some components included thereon may be physically stored on a remote computing device. For example, some of the software components in the data storage 108 may be stored on a remote server accessible by the device 100. The data storage 108 may include speech dataset 110 and the program instructions 120.

In some examples, the speech dataset 110 may include a plurality of speech sounds associated with first voice characteristics of a first voice. For example, the plurality of speech sounds may include recorded speech segments from a speaker that has the first voice, that are each assigned to a linguistic term or a linguistic class. The linguistic term (or linguistic class), for example, may include various phonetic features such as phonemes, phones, diphones, triphones, etc.

A phoneme may be considered to be a smallest segment (or a small segment) of an utterance that encompasses a meaningful contrast with other segments of utterances. Thus, a word typically includes one or more phonemes. For example, phonemes may be thought of as utterances of letters; however, some phonemes may represent multiple letters. An example phonemic representation for the English language pronunciation of the word "cat" may be /k/ /ae/ /t/, including the phonemes /k/, /ae/, and /t/ from the English language. In another example, the phonemic representation for the word "dog" in the English language may be /d/ /aw/ /g/, including the phonemes /d/, /aw/, and /g/ from the English language.

Different phonemic alphabets exist, and these alphabets may have different textual representations for the various phonemes therein. For example, the letter "a" in the English language may be represented by the phoneme /ae/ for the sound in "cat," by the phoneme /ey/ for the sound in "atc," and by the phoneme /ah/ for the sound in "beta." Other phonemic representations are possible. As an example, in the English language, common phonemic alphabets may contain about 40 distinct phonemes. In some examples, a phone may correspond to a speech sound. For example, the letter "s" in the word "nods" may correspond to the phoneme /z/ which corresponds to the phone [s] or the phone [z] depending on a position of the word "nods" in a sentence or on a pronunciation of a speaker of the word. In some examples, a sequence of two phonemes (e.g., /k/ /ae/) may be described as a diphone. In this example, a first half of the diphone may correspond to a first phoneme of the two phonemes (e.g., /k/), and a second half of the diphone may correspond to a second phoneme of the two phonemes (e.g., /ae/). Similarly, in some examples, a sequence of three phonemes may be described as a triphone.

Additionally, in some examples, the plurality of speech sounds in the speech dataset 110 may be associated with context features (e.g., linguistic classes, etc.) such as prosodic context, preceding and following phonemes, position of speech sound in syllable, position of syllable in word and/or phrase, position of word in phrase, stress/accent/length features of current/preceding/following syllables, distance from stressed/accented syllable, length of current/preceding/following phrase, end tone of phrase, length of speech sound within the speech signal, etc. By way of example, a pronunciation of the phoneme /ae/ in the word "cat" may be different than a corresponding pronunciation of the phoneme /ae/ in the word "catapult."

Additionally or alternatively, in some examples, the speech dataset 110 may include parametric representations of the plurality of speech sounds of the first voice. For example, the plurality of speech sounds may be represented in the speech dataset 110 by samples of spectral and/or aperiodicity envelopes that describe the plurality of speech sounds. By way of example, a synthetic speech signal of the device 100 may include a hidden Markov model (HMM) chain that corresponds to the acoustic feature parameters indicated in the speech dataset 110. For example, an HMM may model a system such as a Markov process with unobserved (i.e., hidden) states. Each HMM state may be represented as a Gaussian distribution, a von Mises distribution, or any other statistical distribution that characterizes statistical behavior of the state. For example, a statistical distribution may include the acoustic feature parameters of a phoneme that corresponds to a given speech sound of the plurality of speech sounds indicated by the speech dataset 110. Additionally, each state may also be associated with one or more state transitions that specify a probability of making a transition from a current state to another state (e.g., based on context features, etc.).

When applied to the device 100, in some examples, the combination of the statistical distributions and the state transitions for each state may define a sequence of acoustic feature parameters that may be processed to generate a synthetic speech output.

The program instructions 120 comprise various software components including a parameter unit 122, a mapping module 124, a voice characteristics modification unit 126, and a speech synthesis module 128. The various software components 122-128 may be implemented, for example, as an application programming interface (API), dynamically-linked library (DLL), or any other software implementation suitable for providing the program instructions 120 to the processor 106.

The parameter unit 122 may be configured to receive a speech signal (e.g., via the input interface 102) and provide an acoustic feature representation for the speech signal. The acoustic feature representation, for example, may include a parameterization of spectral/aperiodicity aspects (e.g., spectral envelope, aperiodicity envelope, etc.) for the speech signal that may be utilized to regenerate a synthetic pronunciation of the speech signal. Example spectral parameters may include Cepstrum, Mel-Cepstrum, Generalized Mel-Cepstrum, Discrete Mel-Cepstrum, Log-Spectral-Envelope, Auto-Regressive-Filter, Line-Spectrum-Pairs (LSP), Line-Spectrum-Frequencies (LSF), Mel-LSP, Reflection Coefficients, Log-Area-Ratio Coefficients, deltas of these, delta-deltas of these, a combination of these, or any other type of spectral parameter. Example aperiodicity parameters may include Mel-Cepstrum, log-aperiodicity-envelope, filter-bank-based quantization, maximum voiced frequency, deltas of these, delta-deltas of these, a combination of these, or any other type of aperiodicity parameter. Other parameterizations are possible as well such as maximum voiced frequency or fundamental frequency parameterizations.

In some examples, the parameter unit 122 may be configured to sample the acoustic feature parameters described above at harmonic frequencies of the speech signal. For example, a spectral envelope of the speech signal (e.g., Mel-Cepstrum, Log-spectral-envelope, etc.) may be sampled at the harmonic frequencies and/or any other frequencies (e.g., regular frequencies, irregular frequencies, etc.) of the speech signal.

In some examples, where the speech dataset 110 includes parametric representations of the plurality of speech sounds of the first voice, types of the parametric representations may be similar to types of the acoustic feature parameters described above for input speech signal processed by the parameter unit 122. In other examples, where the speech dataset 110 includes the plurality of speech sounds, the parameter unit 122 may also be configured to determine the parametric representations similarly to the determination of the acoustic feature parameters of the input speech signal.

In some examples, the speech signal may be associated with second voice characteristics of a second voice of a speaker of the speech signal. For example, a user of the device 100 may provide the input speech signal having the second voice characteristics of the user (e.g., the second voice).

Accordingly, the mapping unit 124 may be configured to map one or more speech sounds of the speech dataset 110 (e.g., the first voice speech sounds) with at least one portion of the input speech signal (e.g., the second voice speech sounds). By way of example, the mapping unit 124 may identify the one or more speech sounds of the speech dataset 110 that correspond to a linguistic class (e.g., pronunciations of the phoneme /a/ in various contexts, etc.). On one hand, if the one or more speech sounds are included in the speech dataset 110 as recorded speech segments, the mapping module 124 may obtain the acoustic features parameters for the one or more speech sounds via the parameter unit 122, for example. On the other hand, if the one or more speech sounds are included in the speech dataset 110 as statistical distributions (e.g., HMM states, etc.), the mapping unit 124 may obtain representations of the statistical distributions (e.g., Gaussian means, etc.), for example. Further, in the example, the mapping unit 124 may identify the at least one portion of the input speech signal that are similar to the one or more speech sounds of the speech dataset 110. For example, the mapping unit 124 may perform a comparison between the acoustic feature parameters of the one or more speech sounds (e.g., first voice speech sounds) and corresponding parameters generated by the parameter unit 122 of the input speech signal to identify the at least one portion of the input speech signal associated with similar speech sounds to the one or more speech sounds of the speech dataset 110. Example methods for operation of the mapping unit 124 are described in greater detail within embodiments of the present disclosure.

The voice characteristics modification unit 126 may be configured to compare the first voice characteristics with the second voice characteristics based on the mapping. The comparison may include vocal tract characteristics (e.g., vocal tract length, vocal tract shape, etc.), nasal cavity characteristics, and voicing characteristics. The voicing characteristics, for example, may be associated with a glottal formant or a spectral tilt. The glottal format and/or the spectral tilt, for example, may pertain to spectral energy distribution indicated by the acoustic feature parameters of the one or more speech sounds of the speech dataset 110 (e.g., the first voice speech sounds) and corresponding acoustic feature parameters of the at least one portion of the input speech signal (e.g., the second voice speech sounds).

To compensate for differences in the vocal tract characteristics, for example, the voice characteristics modification unit 126 may determine a "warping" component. By way of example, a first speech sound of the first voice may have particular spectral features (e.g., maximums, minimums, etc.) at the frequencies: 1450 Hz, 1600 Hz, 1750 Hz. Similarly, in the example, a second speech sound of the second voice may have corresponding spectral features at the frequencies 1455 Hz, 1595 Hz, 1740 Hz. The difference in the example may be due to differences between the vocal tract characteristics of the first voice and the second voice. Thus, for example, the "warping" component determined by the voice characteristics modification unit 126 may associate the various frequencies accordingly. Further, for example, to compensate for differences in the nasal cavity characteristics (e.g., spectral nulls at high frequencies, etc.) and/or the voicing characteristics, the voice characteristics modification unit 126 may determine a "weighting" component. In the example above, amplitudes of the acoustic feature parameters (e.g., the spectral envelopes) at a particular frequency (e.g., 1750 Hz for the first voice and 1740 Hz for the second voice, etc.) may differ by a factor, and thus the "weighting" component may compensate for such difference.

In some examples, the "warping" component may be sensitive to the "weighting" component. For example, an effect of the "weighting" component may bias the identification of corresponding frequencies by the "warping" component. Therefore, to facilitate fast operation of the voice characteristics modification unit 126, in some examples herein, the comparison performed by the voice characteristics modification unit 126 including the "warping" and the "weighting" components may be performed simultaneously. To that end, for example, the comparison including the vocal tract characteristics, the nasal cavity characteristics, and the voicing characteristics may be performed simultaneously by the voice characteristics modification unit 126.

Accordingly, the voice characteristics modification unit 126 may also be configured to determine a given representation to associate the first voice characteristics with the second voice characteristics based on the comparison. The given representation, for example, may include both the "warping" and the "weighting" components. An example implementation for operation of the voice characteristics modification unit 126 to determine the given representation based on the comparison is presented below.

$S_n(\omega)$ may correspond to the n-th source-speaker (e.g., the first voice) acoustic feature parameters at frequency $\omega$ (e.g., radians, etc.). Similarly, $T_n(\omega)$ may correspond to the n-th target-speaker (e.g., the second voice) acoustic feature parameter at frequency $\omega$ (e.g., radians, etc.). Further, for example, $S_n(\omega)$ and $T_n(\omega)$ may be matched in accordance with the mapping unit 124. Additionally, $w(\omega)$ may correspond to a frequency warping function, and $b(\omega)$ may correspond to a frequency weighting function. In some examples, the frequency warping function ($w(\omega)$) may satisfy the condition illustrated by equation [1] below.

$$w(0)=0 \qquad [1]$$

Further, in accordance with the definitions above, an estimate of the target-speaker (e.g., the second voice) spectral envelope ($\hat{T}_n(\omega)$) at a given frequency $\omega$ that is based on the frequency warping function ($w(\omega)$) and the frequency weighting function ($b(\omega)$) applied to the source-speaker (e.g., the first voice) spectral envelope ($S_n(\omega)$) is illustrated in equation [2] below.

$$\hat{T}_n(\omega)=S_n(w(\omega))+b(\omega) \qquad [2]$$

The voice characteristics modification unit 126 may then determine the given representation that minimizes a criterion of average log-spectral distortion (D), as illustrated in equations [3]-[4] below.

$$D = \frac{1}{N}\sum_{n=1}^{N}\frac{1}{\pi}\int_0^{\pi}(T_n(\omega)-\hat{T}_n(\omega))^2\,d\omega \qquad [3]$$

$$D = \frac{1}{N}\sum_{n=1}^{N}\frac{1}{\pi}\int_0^{\pi}(T_n(\omega)-S_n(w(\omega))-b(\omega))^2\,d\omega \qquad [4]$$

In some examples, the frequency $\omega$ may be quantized to K equal intervals (e.g., $\omega_k$ where k=1, ..., K). Accordingly, the integral in equation [4] may be approximated as a sum as illustrated in equation [5] below.

$$D \simeq \frac{1}{N}\sum_{n=1}^{N}\frac{1}{K}\sum_{k=0}^{K-1}(T_n(\omega_k)-S_n(w(\omega_k))-b(\omega_k))^2 \qquad [5]$$

Further, in some examples, the distortion D may be augmented with a regularization term to penalize rapid variations in frequency weighting function ($b(\omega)$) that may cause audible artifacts, as illustrated in equation [6] below.

$$D \simeq \frac{1}{N}\sum_{n=1}^{N}\frac{1}{K}\sum_{k=0}^{K-1}(T_n(\omega_k)-S_n(w(\omega_k))-b(\omega_k))^2 + \lambda(b(\omega_k)-b(\omega_{k-1}))^2 \qquad [6]$$

In equation [6], $\lambda$ may correspond to a smoothness regularization constant. Further, for example, a condition $b(\omega_{-1})=b(\omega_0)$ may be utilized to determine $b(\omega_{-1})$. As illustrated in equation [6], the distortion D is convex quadratic on $b(\omega_k)$. In turn, an optimal frequency weighting function ($\hat{b}(\omega_k)$) may be determined based on a partial derivative of the distortion D of equation [6], as illustrated in equation [7] below.

$$\hat{b}(\omega_k) = \frac{1}{N(\lambda+1)} \sum_{n=1}^{N} (T_n(\omega_k) - S_n(w(\omega_k))) + \frac{\lambda}{\lambda+1} \hat{b}(\omega_{k-1}) \quad [7]$$

It is noted that in equation [7] the optimal frequency weighting function ($\hat{b}(\omega_k)$) is determined based on the optimal frequency weighting function at a previous frequency ($\hat{b}(\omega_{k-1})$) and on the frequency warping function ($w(\omega_k)$). Accordingly, the distortion D in equation [6] may be modified to include the optimal frequency weighting function ($\hat{b}(\omega_k)$) of equation [7], as illustrated in equation [8] below.

$$D \simeq \frac{1}{N} \sum_{n=1}^{N} \frac{1}{K} \sum_{k=0}^{K-1} \left(T_n(\omega_k) - S_n(w(\omega_k)) - \hat{b}(\omega_k)\right)^2 + \lambda\left(\hat{b}(\omega_k) - \hat{b}(\omega_{k-1})\right)^2 \quad [8]$$

At this point, in some examples, a Dynamic Frequency Warping (DFW) process such as the DFW process used in a pitch synchronous overlap and add (PSOLA) system or any other DFW process may be modified to utilize the distortion D of equation [8] to determine values for optimal frequency warping ($\hat{w}(\omega_k)$) and optimal frequency weighting ($\hat{b}(\omega_k)$) simultaneously. Such values may correspond to the given representation determined by the voice characteristics modification unit 126 and may be utilized to adjust speech sounds associated with the first voice (e.g., the speech dataset 110) to have the second voice characteristics of the second voice (e.g., the second voice characteristics of the input speech signal). Similarly, for example, the process described by equations [1]-[8] may be repeated for other linguistic classes (e.g., other phonemes, etc.) to determine values for optimal frequency warping ($\hat{w}(\omega_k)$) and optimal frequency weighting ($\hat{b}(\omega_k)$) that are associated with the other linguistic classes. In turn, for example, to generate synthetic speech sounds having the second voice characteristics based on speech sounds having the first voice characteristics, the device 100 may apply a filter characterized by an equation similar to equation [2] using corresponding optimal frequency warping and weighting (OFWW) values computed in accordance with equations [7]-[8] (e.g., $\hat{w}(\omega_k)$, $\hat{b}(\omega_k)$, etc.).

The speech synthesis unit 128 may be configured to receive a request for provision of speech content having the second voice characteristics of the second voice based on speech sounds having the first voice characteristics of the first voice (e.g., speech sounds in the speech dataset 110, etc.). Further, the speech synthesis unit 128 may also be configured to responsively generate an output audio signal (e.g., via the output interface 104, etc.) that corresponds to a pronunciation of the speech content indicated by the request having the second voice characteristics.

By way of example, the speech synthesis unit 128 may determine a sequence of speech sounds (or HMMs) from within the speech dataset 110 (e.g., having the first voice characteristics) that correspond to the speech content of the request. Further, for example, the speech synthesis unit 128 may apply the given representation determined by the voice characteristics modification unit 126 on the sequence of speech sounds (or the HMMs) to adjust the sequence of speech sounds to have the second voice characteristics. In this example, the speech synthesis unit 128 may be operated in an "online" mode that corresponds to performing voice conversion during speech synthesis. Alternatively, for example, the device 100 may modify the speech dataset 110 based on the given representation determined by the voice characteristics modification unit 126. In this example, the sequence of speech sounds (or the HMMs) may already have the second voice characteristics. In this example, the speech synthesis unit 128 may be operated in an "offline" mode that corresponds to performing the voice conversion prior to the speech synthesis. Other examples are possible as well and are described in greater detail within embodiments of the present disclosure.

In some examples, the given representation from the voice characteristics modification unit 126 (e.g., $\hat{w}(\omega_k)$, $\hat{b}(\omega_k)$, etc.) may not correspond to the exact frequencies in the speech sounds having the first voice characteristics. In these examples, an interpolation technique may be utilized to determine the optimal frequency warping and weighting (OFWW) values for such frequencies. Example interpolation techniques may be based on Kullback-Leibler, Euclidean distance, or any other distance between the frequencies of the speech sounds and the frequencies ($\omega_k$) in the given representation.

In some examples, the speech synthesis unit 128 may utilize a vocoder to provide the modified speech sounds of the speech dataset 110 having the second voice characteristics. In one example, the modified HMMs or other statistical models (e.g., having the second voice characteristics) associated with speech sounds of the speech dataset 110 may be provided to the vocoder to generate a synthetic speech signal. In another example, the sequence of speech sounds based on the request may be provided to the vocoder along with the given representation from the voice characteristics modification unit 126 and the vocoder may apply, for example, the "warping" and "weighting" components to modify the sequence of speech sounds. Other examples are possible as well. Example vocoders that may be utilized by the speech synthesis unit 128 may include sinusoidal vocoders (e.g., AhoCoder, Harmonic-plus-Noise Model (HNM) vocoder, Sinusoidal Transform Codec (STC), etc.) and/or non-sinusoidal vocoders (e.g., STRAIGHT, etc.).

It is noted that functional blocks of FIG. 1 are illustrated for convenience in description. In some embodiments, the device 100 may be implemented using more or less components configured to perform the functionalities described in FIG. 1. For example, the parameter unit 122, the mapping unit 124, the voice characteristics modification unit 126, and/or the speech synthesis unit 128 may be implemented as one, two, or more software components. Further, in some examples, components of the device 100 may be physically implemented in one or more computing devices according to various applications of the device 100. For example, the speech dataset 110 may be included in a remote computing device (e.g., server) accessible by the device 100. Other configurations are possible as well.

Figure 2:
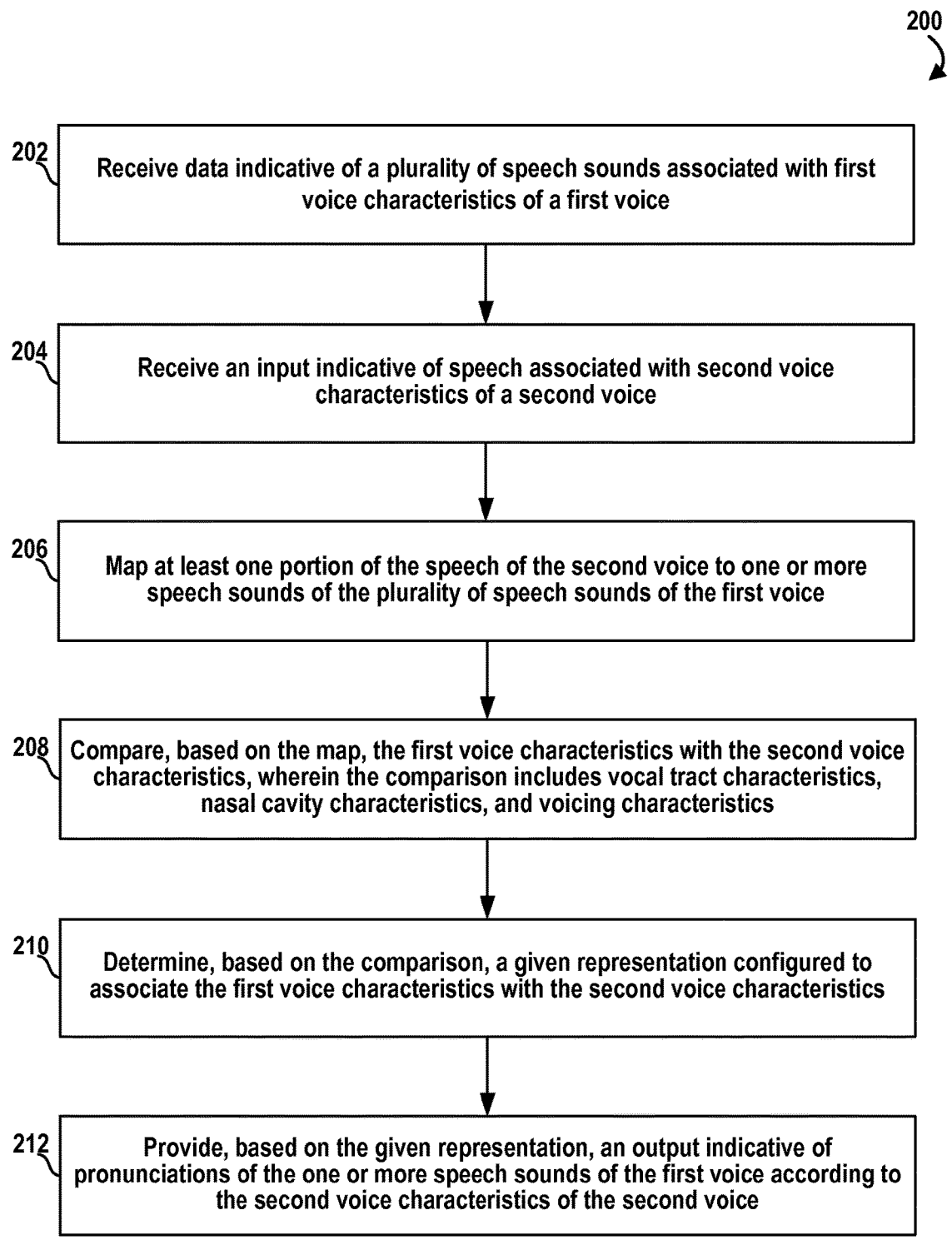
FIG. 2 is a block diagram of an example method, in accordance with at least some embodiments described herein.

FIG. 2 is a block diagram of an example method 200, in accordance with at least some embodiments described herein. Method 200 shown in FIG. 2 presents an embodiment of a method that could be used with the device 100, for example. Method 200 may include one or more operations, functions, or actions as illustrated by one or more of blocks 202-212. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In some examples, for the method 200 and other processes and methods disclosed herein, each block may represent circuitry that is wired to perform the specific logical functions in the process.

At block 202, the method 200 includes receiving data indicative of a plurality of speech sounds associated with first voice characteristics of a first voice. In one example, the data may include a speech corpus, similar to the speech dataset 100 of the device 100, which includes the plurality of speech sounds as recorded speech utterances. In another example, the data may include parametric representations of the plurality of speech sounds such as HMM models. In yet another example, the data may include a combination of recorded speech sounds and HMM models. Other configurations of the data are possible as well.

At block 204, the method 200 includes receiving an input indicative of speech associated with second voice characteristics of a second voice. The input, for example, may include an articulation of a phrase by the second voice that is associated with a speaker other than the speaker of the plurality of speech sounds at block 202.

At block 206, the method 200 includes mapping at least one portion of the speech of the second voice to one or more speech sounds of the plurality of speech sounds of the first voice. By way of example, the method 200 may identify the one or more speech sounds of the first voice that are associated with a linguistic class (e.g., phoneme /a/), and may match the one or more speech sounds with portions of the speech of the second voice that are similar to pronunciations of the linguistic class.

Accordingly, in some examples, the method 200 may also include determining the one or more speech sounds from within the plurality of speech sounds of the first voice based on an association between the one or more speech sounds and a linguistic term. The linguistic term, for example, may include a phoneme or text. In these examples, the method 200 may also include determining the at least one portion of the speech of the second voice based on the at least one portion of the speech being associated also with the linguistic term.

At block 208, the method 200 includes comparing the first voice characteristics with the second voice characteristics based on the mapping. The comparison may include vocal tract characteristics, nasal cavity characteristics, and voicing characteristics. For example, the comparison may be similar to the comparison performed by the voice characteristics modification unit 126 of the device 100 (e.g., based on equations [1]-[8], etc.).

In some examples, the voicing characteristics may be associated with a glottal formant or a spectral tilt. The spectral tilt may be between spectral features of a first speech sound of the first voice and corresponding spectral features of a second speech sound of the second voice. In some examples, the vocal tract characteristics may be associated with one or more of a vocal tract length or a vocal tract shape.

In some examples, the method 200 may also include determining acoustic feature representations for the one or more speech sounds of the first voice and the at least one portion of the speech of the second voice. In some examples, the glottal formant and/or the spectral tilt may be indicated by the acoustic feature representations. Further, in some examples, the nasal cavity characteristics may be associated with spectral nulls indicated by the acoustic feature representations.

Additionally, in these examples, the method 200 may also include identifying the first voice characteristics and the second voice characteristics based on the acoustic feature representations. By way of example, a device of the method 200 may determine statistical models (e.g., HMMs) for the plurality of speech sounds of the first voice, and acoustic feature parameters (e.g., Mel-Cepstrum parameters, etc.) for the at least one portion of the speech of the second voice. The device may then proceed to identify the first voice characteristics and the second voice characteristics similarly to the voice characteristics modification unit 126 of the device 100 (e.g., "warping" and "weighting" components, etc.).

Accordingly, in some examples, the method 200 may also include determining one or more statistical models associated with the one or more speech sounds of the first voice. The one or more statistical models may be indicative of the first voice characteristics. In these examples, the method 200 may also include modifying the one or more statistical models such that the one or more statistical models are indicative of the second voice characteristics. The one or more statistical models, for example, may include Hidden Markov Models (HMMs) or Deep Neural Network (DNN) nodes. Other examples are possible as well.

At block 210, the method 200 includes determining a given representation configured to associate the first voice characteristics with the second voice characteristics based on the comparison. The given representation, for example, may include the optimal frequency warping and weighting (OFWW) described in the voice characteristics modification unit 126 of the device 100.

In some examples, the method 200 may include determining a distortion representation that includes a frequency-warping component and a frequency-weighting component based on the comparison. The distortion representation, for example, may correspond to the distortion D of equation [8]. Accordingly, the frequency-warping component may be configured to associate given vocal tract characteristics of the first voice with corresponding vocal tract characteristics of the second voice. The frequency-weighting component may be configured to associate given voicing characteristics of the first voice with corresponding voicing characteristics of the second voice. The frequency-weighting component may also be configured to associate given nasal cavity characteristics of the first voice with corresponding nasal cavity characteristics of the second voice. In these examples, determining the given representation at block 210 may be based on the distortion representation. For example, the frequency-warping component may be similar to the optimal frequency warping function ($\hat{w}(\omega_k)$) described in the voice characteristics modification unit 126, and the frequency-weighting component may be similar to the optimal frequency weighting function ($\hat{b}(\omega_k)$) described in the voice characteristics modification unit 126. Further, in some examples, the method 200 may include modifying the frequency-weighting component based on a smoothing modulation factor. For example, the smoothing modulation factor may correspond to the smoothness regulation constant ($\lambda$) of equation [6].

At block 212, the method 200 includes providing an output indicative of pronunciations of the one or more speech sounds of the first voice according to the second voice characteristics of the second voice based on the representation. In one example, the method 200 may apply the given representation (e.g., OFWW) to the plurality of speech sounds based on use of a vocoder to modify the plurality of speech sounds. In another example, the method 200 may apply the given representation to statistical models of the plurality of speech sounds (e.g., Gaussian means, etc.).

In some examples, the method 200 may also include receiving a speech corpus that includes the plurality of speech sounds associated with the first voice characteristics. The speech corpus, for example, may be similar to the speech dataset 110 of the device 100. In these examples, the method 200 may also include modifying the speech corpus to include the one or more speech sounds associated with the second voice characteristics based on the given representation. For example, the OFWW filter described above may be applied to the speech corpus to adjust voice characteristics of the speech corpus to correspond to the second voice characteristics.

Figure 3:
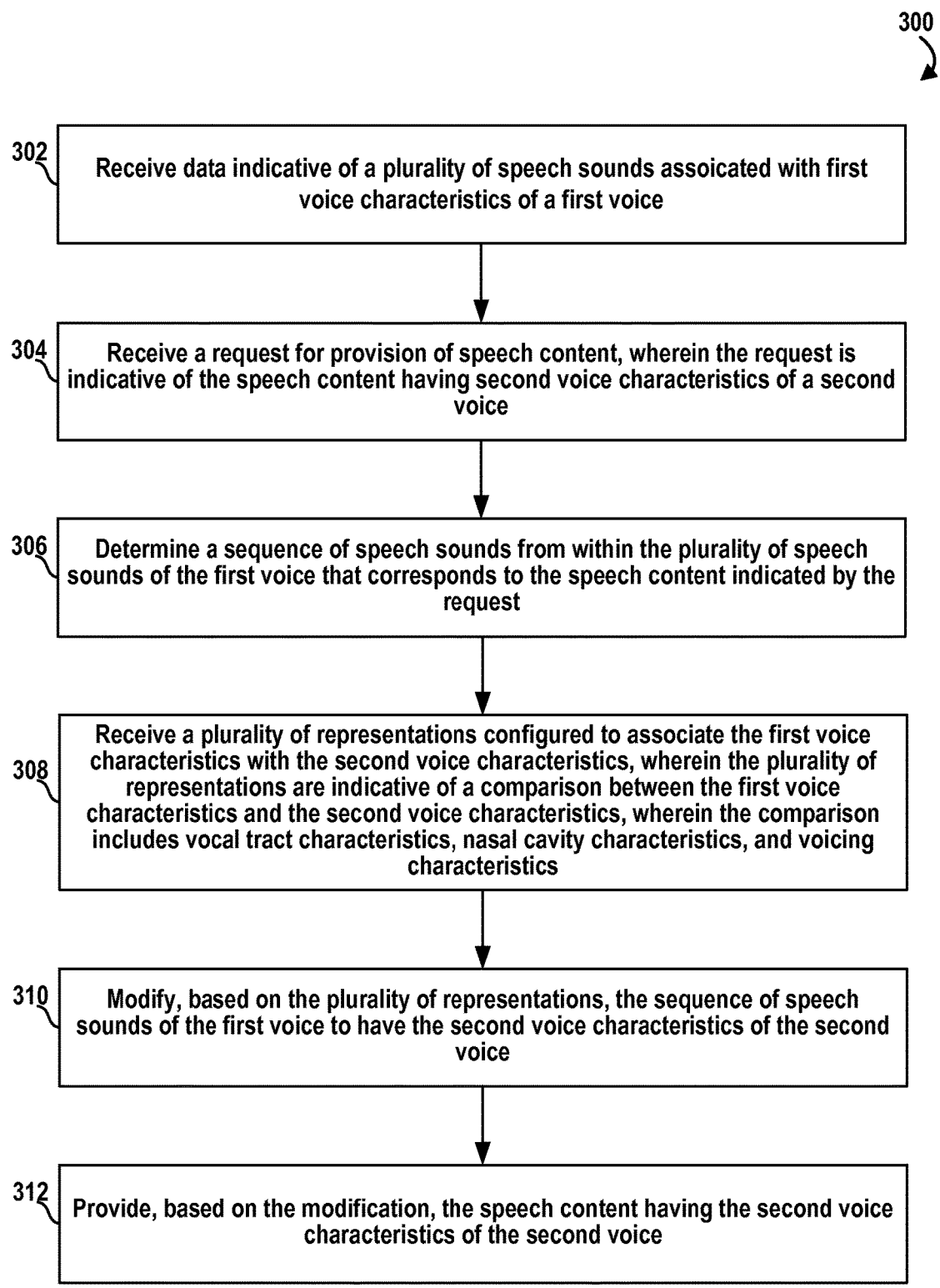
FIG. 3 is a block diagram of another example method, in accordance with at least some embodiments described herein.

FIG. 3 is a block diagram of an example method 300, in accordance with at least some embodiments described herein. Method 300 shown in FIG. 3 presents an embodiment of a method that could be used with the device 100, for example. Method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 302, the method 300 includes receiving data indicative of a plurality of speech sounds associated with first voice characteristics of a first voice. In one example, the data may include a speech corpus, similar to the speech dataset 100 of the device 100, which includes the plurality of speech sounds as recorded speech utterances. In another example, the data may include parametric representations of the plurality of speech sounds such as HMM models. In yet another example, the data may include a combination of recorded speech sounds and HMM models. Other configurations of the data are possible as well.

At block 304, the method 300 includes receiving a request for provision of speech content. The request may be indicative of the speech content having second voice characteristics of a second voice. For example, a navigation device of the method 300 may receive the request for providing instructions to an address. The request, for example, may include speech from a user that has the second voice characteristics. In turn, for example, the navigation device may be configured to provide the instructions to the address as the speech content having the second voice characteristics.

At block 306, the method 300 includes determining a sequence of speech sounds from within the plurality of speech sounds that corresponds to the speech content indicated by the request. In the example of the navigation device, the device may obtain the sequence of speech sounds from a speech corpus that includes the plurality of speech sounds of the first voice. The sequence of speech sounds, in this example, may correspond to the instructions to the address.

In some examples, the method 300 may also include determining a sequence of linguistic terms that corresponds to the speech content indicated by the request. In these examples, the plurality of speech sounds of the first voice may be associated with the plurality of linguistic terms. In the example of the navigation device, the device may obtain the sequence of speech sounds from the speech corpus that correspond to the sequence of linguistic terms (e.g., text of the instructions to the address, etc.).

At block 308, the method 300 includes receiving a plurality of representations configured to associate the first voice characteristics with the second voice characteristics. The plurality of representations may be indicative of a comparison between the first voice characteristics and the second voice characteristics. The comparison may include vocal tract characteristics, nasal cavity characteristics, and voicing characteristics. For example, the plurality of representations may be similar to the OFWW transforms described in the voice characteristics module 126 of the device 100. Further, for example, the plurality of representations may be associated with linguistic terms pertaining to the sequence of speech sounds.

At block 310, the method 300 includes modifying the sequence of speech sounds of the first voice to have the second voice characteristics of the second voice based on the plurality of representations. For example, a device of the method 300 may perform the functions of the voice characteristics module 126 and/or the speech synthesis module 128 of the device 100 to modify the sequence of speech sounds to have the second voice characteristics (e.g., frequency-warping, frequency-weighting, etc.).

At block 312, the method 300 includes providing the speech content having the second voice characteristics of the second voice based on the modification. In the example of the navigation device, the method 300 at block 312 may provide the instructions to the address having the second voice characteristics of the user based on modifying the sequence of speech sounds of the first voice to have the second voice characteristics.

Figure 4:
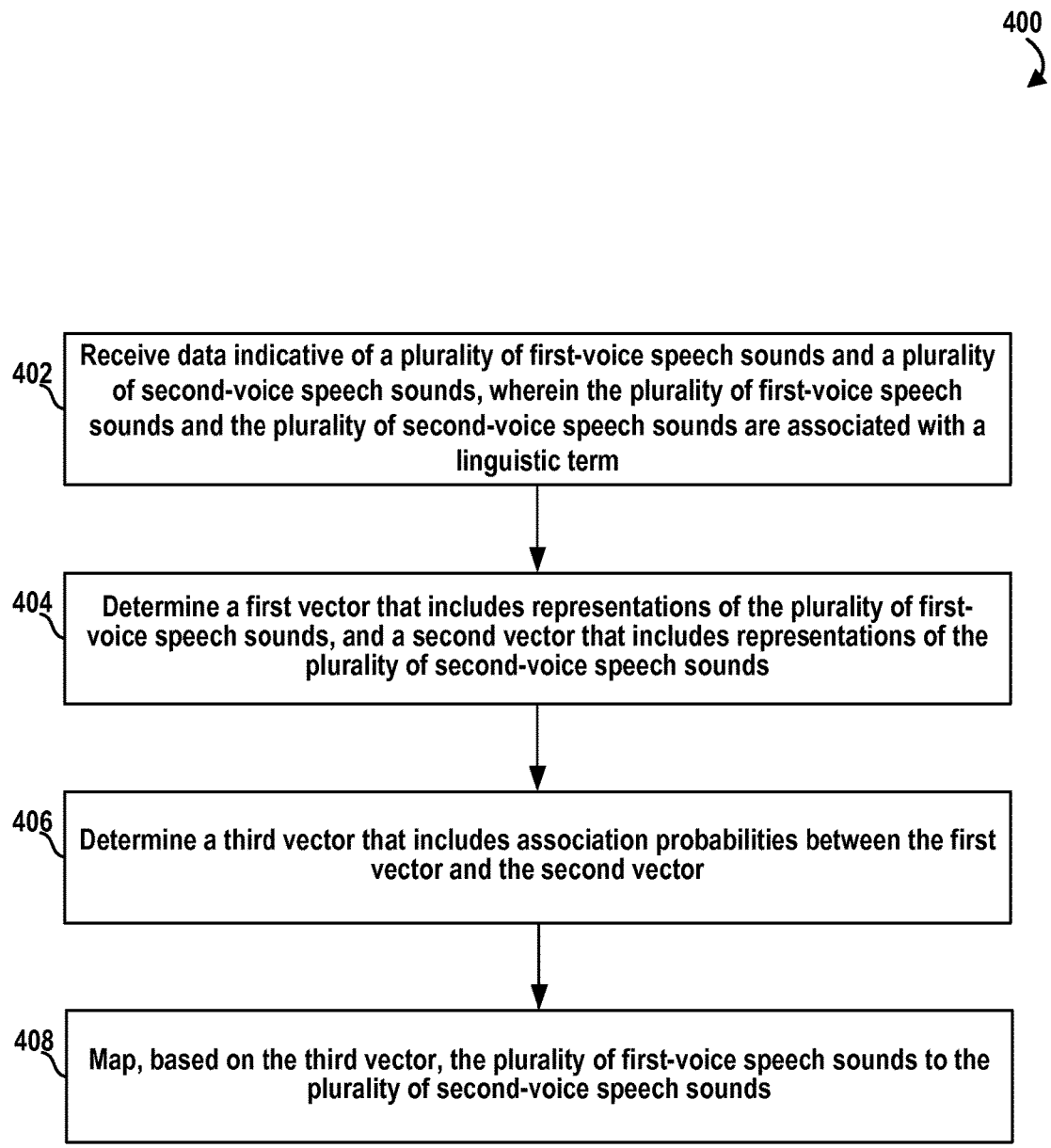
FIG. 4 is a block diagram of another example method, in accordance with at least some embodiments described herein.

FIG. 4 is a block diagram of an example method 400, in accordance with at least some embodiments described herein. Method 400 shown in FIG. 4 presents an embodiment of a method that could be used with the device 100, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

The method 400, in some examples, may perform the functions of the mapping unit 124 and/or other components of the device 100.

At block 402, the method 400 includes receiving data indicative of a plurality of first-voice speech sounds and a plurality of second-voice speech sounds. The plurality of first-voice speech sounds and the plurality of second-voice speech sounds may be associated with a linguistic term. For example, the plurality of first-voice speech sounds may correspond to the one or more speech sounds in the speech dataset 110 of the device 100 that are associated with the linguistic term (e.g., linguistic class) such as a phoneme. Further, for example, the plurality of second-voice speech sounds may correspond to the at least one portion of the speech received by the input interface 102 of the device 100 that have the second voice characteristics.

At block 404, the method 400 includes determining a first vector that includes representations of the plurality of first-voice speech sounds, and a second vector that includes representations of the plurality of second-voice speech sounds. In some examples, the representations of the plurality of first-voice speech sounds may be stored in a dataset such as the speech dataset 110 of the device 100. For example, the speech dataset 110 may include Hidden Markov Models (HMMs) that simulate the first-voice speech sounds. In some examples, the representations of the plurality of second-voice speech sounds may be determined at the block 404 as acoustic feature parameters of spectral envelopes of the second-voice speech sounds. For example, a Mel-Cepstral representation of a spectral envelope may be sampled.

By assembling the first vector with Gaussian distributions of the first-voice speech sounds and the second vector with Gaussian distributions of the second-voice speech sounds, the method 400 may then associate the first-voice speech sounds with the second-voice speech sounds by solving an optimization problem, for example. In some examples, the first vector and the second vector may include or be based on the means of the Gaussian distributions and not the weights (e.g., probabilities) of the Gaussian distributions. The optimization problem, for instance, may attempt to formulate the following transformation function:

$$y=F(x) \qquad [9]$$

In equation [9] above, x belongs to an X space that includes the Gaussian distributions of the first vector and y belongs to a Y space that includes the Gaussian distributions of the second vector. For example, the X space may correspond to an input space and the Y space may correspond to an output space. Thus, for example, equation [9] may represent a solution for the optimization problem that corresponds to the mapping module 350 of the system 300. For example, equation [9] may provide parametric mapping from the X space to the Y space. Further, the equation [9] may be utilized to associate second-voice speech sounds with first-voice speech sounds to compensate inter-speaker differences between the first voice and the second voice, for example. On the other hand, the equation [9] may also provide non-parametric mapping from the Y space to the X space for example.

In examples where there are N first-voice speech sounds in the x space and Q second-voice speech sounds in the y space, a given first-voice speech sound and a given second-voice speech sound may be represented, respectively, as $y_q$ and $x_n$, where q and n are real integers in the ranges, respectively, 1 to Q and 1 to N. Further, a distortion metric $d(y_q,x_n)$ between the first vector x and the second vector y may be expressed as:

$$d(y_q,x_n)=(y_q-F(x_n))^T W_q (y_q-F(x_n)) \qquad [10]$$

The distortion metric in equation [10] describes the distortion (e.g., distance) between $y_q$ and $x_n$. Additionally, in equation [10], $W_q$ is a weighting matrix depending on the second vector y. The weighting matrix may allow incorporating frequency weighting in the distortion metric for example. Further, in some examples, a joint probability of matching $y_q$ and pressed as $p(y_q,x_n)$. For example, the average distortion D for all possible vector combinations in equation [9] may be expressed as:

$$D=\Sigma_{n,q} p(y_q,x_n) d(y_q,x_n) = \Sigma_q p(y_q) \Sigma_n p(x_n|y_q) d(y_q,x_n) \qquad [11]$$

The association probabilities $p(x_n|y_q)$ in equation [11] indicate the mapping and/or association between a given first-voice speech sound corresponding to $x_n$ and a given second-voice speech sound corresponding to $y_q$. Additionally, in some examples, the y space probabilities $p(y_q)$ in equation [11] may be to be uniformly distributed for all Q. In other words, $$p(y_q) = \frac{1}{Q}.$$

In some examples, equation [11] may imply that for every second-voice speech sound, equation [9] will assign at least one first-voice speech sound, while some first-voice speech sounds may not have a matching second-voice speech sound. In other examples, the relationship may be opposite. Thus, a bi-directional nature of the mapping (e.g., parametric from Y space to X space, non-parametric from X space to Y space) may be implied by the distortion equation [11] for example.

Additionally, in this example, by minimizing the average distortion D and the association probabilities $p(x_n|y_q)$ simultaneously in equation [11], the optimization problem may be solved to determine the optimal mapping of the equation [9].

At block 406, the method 400 includes determining a third vector that includes association probabilities between the first vector and the second vector. Below is an example computation for determining the association probabilities $p(x_n|y_q)$.

The method 400, for example, may simulate the distortion metric of equation [10] as a distance function. Thus, in this example, the computation may involve determining the minimum distance between a given Gaussian distribution mean of the first vector (e.g., $x_n$) and a given Gaussian distribution mean of the second vector (e.g., $y_q$). In other words, the method 400 may be configured to identify a given first-voice speech sound that is proximal to a given second-voice speech sound, for example. For instance, for a given y space vector, a nearest neighbor search I(q) for the nearest x space vector may be expressed as:

$$I(q)=\text{argmin}_n \{d(y_q,x_n)\} \qquad [12]$$

In this example, the association probabilities in the third vector may then be computed by the method 400 as the expression:

$$p(x_n|y_q) = \begin{cases} 1, & n = I(q) \\ 0, & \text{otherwise} \end{cases} \qquad [13]$$

For example, according to equation [13], the association probabilities map second-voice speech sounds from the Y space to first-voice speech sounds from the X space.

It is noted that the example above is for example purposes and other computations may be possible to determine the association probabilities. For example, deterministic annealing computations involving an annealing temperature may be alternatively used.

At block 408, the method 400 includes mapping the plurality of first-voice speech sounds to the plurality of second-voice speech sounds based on the third vector. The mapping, for example, may be represented as the transformation function of equation [9].

For example, the optimization problem described in the previous blocks may be solved based on the third vector in block 408. One example solution may involve performing a linear regression. For example, the transformation function of equation [9] may be represented as a mixture-of-linear regressions function expressed as:

$$F(x_n) + \Sigma_{k=1}^{K} p(k|x_n)[\mu_k + \Sigma_k x_n], \quad [14]$$

where $\mu_k$ is a bias vector of the linear regression, $\Sigma_k$ is a linear transformation matrix of the k-th class, and $p(k|x_n)$ is the probability that $x_n$ to the k-th class. Note that the linear transformation matrix $\Sigma_k$ is in matrix form. In some examples, the matrix form may be inconvenient, thus, the linear transformation matrix $\Sigma_k$ may be reformulated by using a vector operator vec{ } and a Kronecker product:

$$\Sigma_k x_n = vec\{\Sigma_k x_n\} = x_n^T \otimes I_D) vec\{\Sigma_k\} = (x_n^T \otimes I_D) \sigma_k, \quad [15]$$

where $\sigma_k$ is a vectorized transformation matrix of $\Sigma_k$, and $I_D$ is an identity matrix. Note that the operator vec{ } is simply rearranging the parameters of $\Sigma_k$ by stacking together the columns of the matrix.

In some examples, the transform vector $\Sigma_k$ may be structured. In these examples, the structure may be incorporated in equation [15] with a repetition matrix R. The repetition matrix R may include zeros and ones at the appropriate location to incorporate the structure of the transform vector $\Sigma_k$ for example. The inclusion of the repetition matrix R may yield the following expression:

$$\Sigma_k x_n (x_n^T \otimes I_D) R \sigma_k' = X_n \sigma_k' \quad [16]$$

where $\sigma_k'$ includes free parameters of the structured matrix, and $X_n$ is an space data matrix that includes recasted information of $x_n$.

In some examples, the data matrix $X_n$ may be sparse. In these examples, the linear transformation matrix $\Sigma_k$ may be constrained as the block transform matrix expression:

$$\Sigma_k = \begin{bmatrix} \Sigma_k' & 0 & 0 \\ 0 & \Sigma_k' & 0 \\ 0 & 0 & \Sigma_k' \end{bmatrix} \quad [17]$$

In the example of equation [17], $\sigma_k' = vec\{\Sigma_k'\}$.

Further, the transformation function $F(x_n)$ (e.g., mapping) may then be expressed as a simple linear regression:

$$F(x_n) = \Delta_n \mu + B_n \sigma = [\Delta_n \quad B_n] \begin{bmatrix} \mu \\ \sigma \end{bmatrix} = \Gamma_n \gamma, \quad [18]$$

where:

$$\Delta_n = [p(k=1|x_n)I_D p(k=2|x_n)I_D \ldots p(k=K|x_n)I_D], \quad [19]$$

$$\mu = [\mu_1^T \mu_2^T \ldots \mu_K^T]T. \quad [20]$$

$$B_n = [p(k=1|x_n)X_n p(k=2|x_n)X_n \ldots p(k=K|x_n)X_n], \quad [21]$$

$$\sigma = [\sigma_1'^T \sigma_2'^T \ldots \sigma_K'^T]^T. \quad [22]$$

Further, the optimization problem may then be solved by minimizing the average distortion D of equation [11] with respect to the linear regression variable γ. For example, a corresponding partial derivative may be equated to zero:

$$\frac{\partial D'}{\partial \gamma} = 0, \quad [23]$$

which yields the following solution for γ:

$$\gamma = (\Sigma_q p(y_q) \Sigma_n p(x_n|y_q) \Gamma_n^T W_q \Gamma_n)^{-1} (\Sigma_q P(y_q) \Sigma_n p(x_n|y_q) \Gamma_n^T W_q y_q \quad [24]$$

Note that the solution in equation [24] includes the association probabilities $p(x_n|y_q)$ from the third vector determined at block 406. Thus, at block 408, the mapping (e.g., equation [9]) may be determined based on the third vector. In some examples, the linear regression computation may involve repeating blocks 406 and 408 until convergence of the linear regression variables, for example, in the equation [18].

Figure 5:
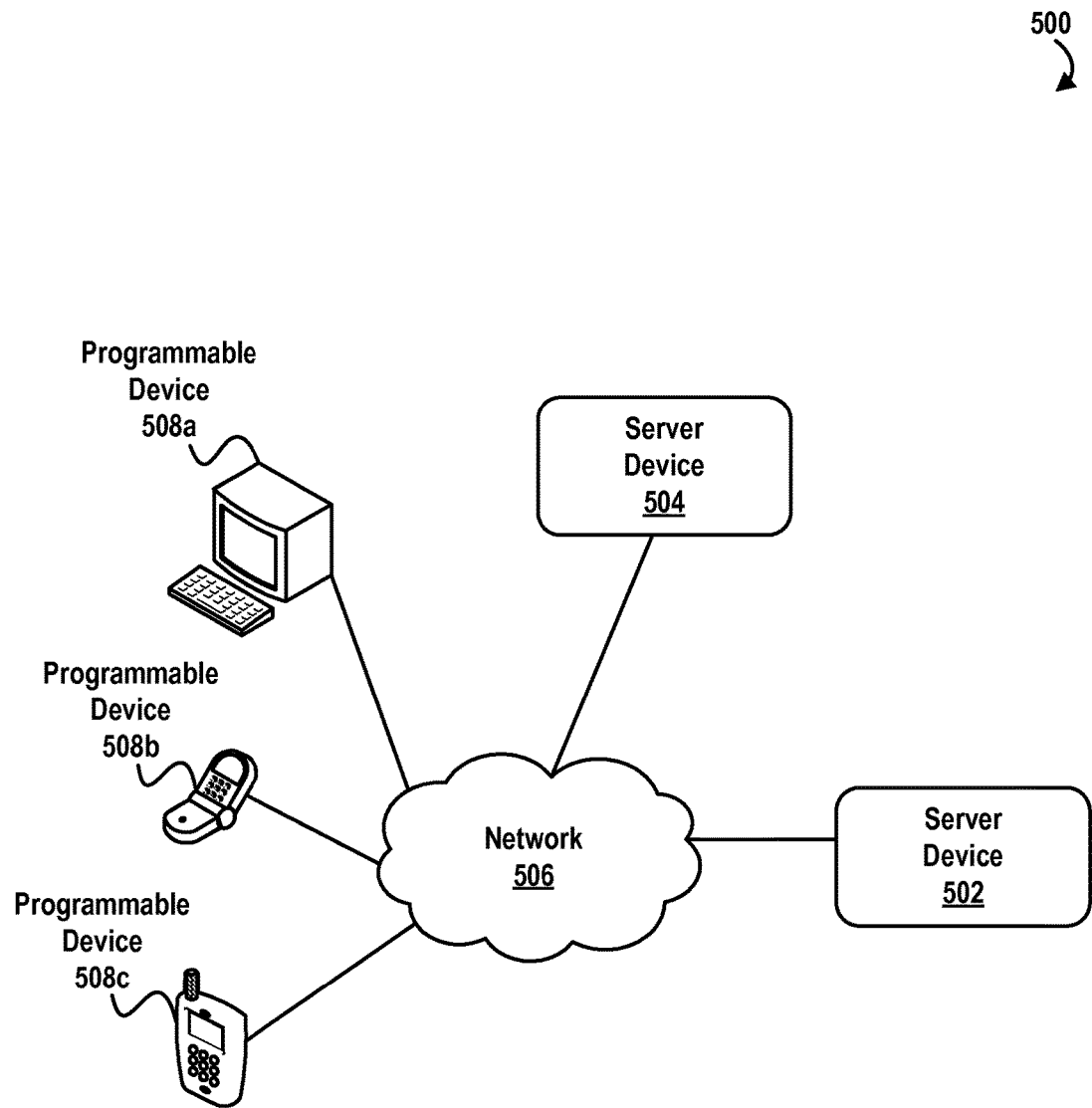
FIG. 5 illustrates an example distributed computing architecture, in accordance with at least some embodiments described herein.

FIG. 5 illustrates an example distributed computing architecture 500, in accordance with an example embodiment. FIG. 5 shows server devices 502 and 504 configured to communicate, via network 506, with programmable devices 508a, 508b, and 508c. The network 506 may correspond to a LAN, a wide area network (WAN), a corporate intranet, the public Internet, or any other type of network configured to provide a communications path between networked computing devices. The network 506 may also correspond to a combination of one or more LANs, WANs, corporate intranets, and/or the public Internet.

Although FIG. 5 shows three programmable devices, distributed application architectures may serve tens, hundreds, thousands, or any other number of programmable devices. Moreover, the programmable devices 508a, 508b, and 508c (or any additional programmable devices) may be any sort of computing device, such as an ordinary laptop computer, desktop computer, network terminal, wireless communication device (e.g., a tablet, a cell phone or smart phone, a wearable computing device, etc.), and so on. In some examples, the programmable devices 508a, 508b, and 508c may be dedicated to the design and use of software applications. In other examples, the programmable devices 508a, 508b, and 508c may be general purpose computers that are configured to perform a number of tasks and may not be dedicated to software development tools. For example the programmable devices 508a-508c may be configured to provide speech processing functionality similar to that discussed in FIGS. 1-4. For example, the programmable devices 508a-c may include a device such as the device 100.

The server devices 502 and 504 can be configured to perform one or more services, as requested by programmable devices 508a, 508b, and/or 508c. For example, server device 502 and/or 504 can provide content to the programmable devices 508a-508c. The content may include, but is not limited to, text, web pages, hypertext, scripts, binary data such as compiled software, images, audio, and/or video. The content can include compressed and/or uncompressed content. The content can be encrypted and/or unencrypted. Other types of content are possible as well.

As another example, the server device 502 and/or 504 can provide the programmable devices 508a-508c with access to software for database, search, computation (e.g., vocoder speech synthesis), graphical, audio (e.g. speech content), video, World Wide Web/Internet utilization, and/or other functions. Many other examples of server devices are possible as well. In some examples, the server devices 502 and/or 504 may perform at least some of the functions described in FIGS. 1-4.

The server devices 502 and/or 504 can be cloud-based devices that store program logic and/or data of cloud-based applications and/or services. In some examples, the server devices 502 and/or 504 can be a single computing device residing in a single computing center. In other examples, the server devices 502 and/or 504 can include multiple computing devices in a single computing center, or multiple computing devices located in multiple computing centers in diverse geographic locations. For example, FIG. 5 depicts each of the server devices 502 and 504 residing in different physical locations.

In some examples, data and services at the server devices 502 and/or 504 can be encoded as computer readable information stored in non-transitory, tangible computer readable media (or computer readable storage media) and accessible by programmable devices 508a, 508b, and 508c, and/or other computing devices. In some examples, data at the server device 502 and/or 504 can be stored on a single disk drive or other tangible storage media, or can be implemented on multiple disk drives or other tangible storage media located at one or more diverse geographic locations.

Figure 6:
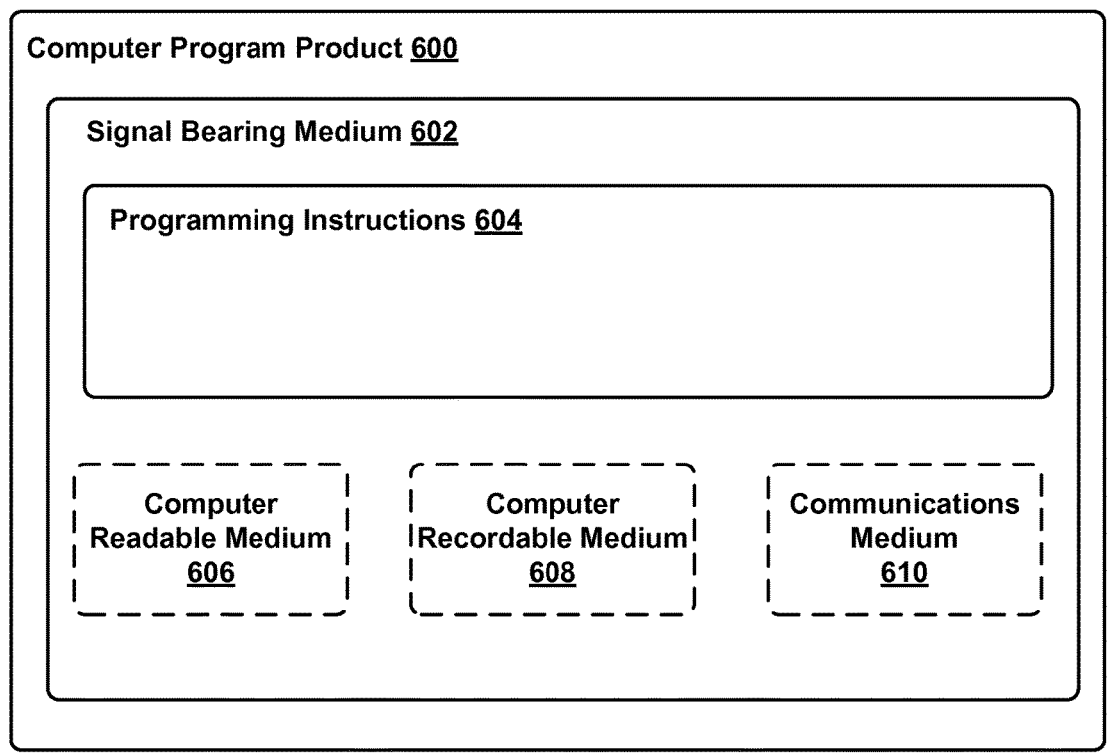
FIG. 6 depicts an example computer-readable medium configured according to at least some embodiments described herein.

FIG. 6 depicts an example computer-readable medium configured according to at least some embodiments described herein. In example embodiments, the example system can include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 200-400) can be implemented by computer program instructions encoded on a computer readable storage media in a machine-readable format, or on other media or articles of manufacture (e.g., the program instructions 120 of the device 100, or the instructions that operate the server devices 502-504 and/or the programmable devices 508a-508c in FIG. 5). FIG. 6 is a schematic illustrating a conceptual partial view of an example computer program product that includes a computer program for executing a computer process on a computing device, arranged according to at least some embodiments disclosed herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 can be a computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communication medium 610 (e.g., a fiber optic cable, a waveguide, a wired communications link, etc.). Thus, for example, the signal bearing medium 602 can be conveyed by a wireless form of the communications medium 610.

The one or more programming instructions 604 can be, for example, computer executable and/or logic implemented instructions. In some examples, a computing device, such as the processor-equipped device 100 of FIG. 1 and/or programmable devices 508a-c of FIG. 5, may be configured to provide various operations, functions, or actions in response to the programming instructions 604 conveyed to the computing device by one or more of the computer readable medium 606, the computer recordable medium 608, and/or the communications medium 610. In other examples, the computing device can be an external device such as server devices 502-504 of FIG. 5 in communication with a device such as the device 100 and/or the programmable devices 508a-508c.

The computer readable medium 606 can also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server. For example, the computer program product 600 can implement the functionalities discussed in the description of FIGS. 1-5.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a device that includes one or more processors, data indicative of a plurality of speech sounds associated with first voice characteristics of a first voice;
   receiving an input indicative of speech associated with second voice characteristics of a second voice;
   mapping at least one portion of the speech of the second voice in real-time as the least one portion of the speech is received to one or more speech sounds of the plurality of speech sounds of the first voice;
   based on the mapping, performing a comparison between the first voice characteristics with the second voice characteristics, wherein performing the comparison includes determining a distortion representation that includes a frequency warping component and a frequency-weighting component determined simultaneously, wherein the frequency-warping component associates vocal tract characteristics of the first voice with corresponding vocal tract characteristics of the second voice, and wherein the frequency-weighting component associates voicing and nasal cavity characteristics of the first voice with corresponding voicing and corresponding nasal cavity characteristics of the second voice;

determining, based on the comparison including the determined distortion representation, an indication of spectral distortion between a modified spectral representation of a first speech sound of the first voice and a spectral representation of a second speech sound of the second voice, wherein the modified spectral representation is indicative of a pronunciation of the first speech sound according to the second voice characteristics;

determining, based on the spectral distortion, a given representation configured to associate the first voice characteristics with the second voice characteristics; and providing, based on the given representation, an output indicative of pronunciations of the one or more speech sounds of the first voice according to the second voice characteristics of the second voice.

2. The method of claim 1, wherein the vocal tract characteristics are associated with one or more of a vocal tract length or a vocal tract shape.

3. The method of claim 1, further comprising:
determining acoustic feature representations for the one or more speech sounds of the first voice and the at least one portion of the speech of the second voice; and
identifying, based on the acoustic feature representations, the first voice characteristics and the second voice characteristics.

4. The method of claim 3, wherein a glottal formant or a spectral tilt of the voicing characteristics are indicated by the acoustic feature representations, and wherein the nasal cavity characteristics are associated with spectral nulls indicated by the acoustic feature representations.

5. The method of claim 1, further comprising:
determining one or more statistical models associated with the one or more speech sounds of the first voice, wherein the one or more statistical models are indicative of the first voice characteristics; and
modifying, based on the given representation, the one or more statistical models such that the one or more statistical models are indicative of the second voice characteristics, wherein providing the output is based on the modification of the one or more statistical models.

6. The method of claim 5, wherein the one or more statistical models include a Hidden Markov Model (HMM) or a Deep Neural Network (DNN).

7. The method of claim 1, further comprising:
receiving a speech corpus that includes the plurality of speech sounds associated with the first voice characteristics, wherein receiving the data includes receiving the speech corpus; and
modifying, based on the given representation, the speech corpus to include the one or more speech sounds associated with the second voice characteristics, wherein providing the output is based on the modified speech corpus.

8. The method of claim 1, further comprising:
modifying the frequency-weighting component based on a smoothing modulation factor.

9. The method of claim 1, further comprising:
determining the one or more speech sounds from within the plurality of speech sounds of the first voice based on an association between the one or more speech sounds and a linguistic term, wherein the linguistic term includes one or more of a phoneme or text; and determining the at least one portion of the speech of the second voice based on the at least one portion of the speech being associated also with the linguistic term, and wherein the mapping is based on the determination of the one or more speech sounds and the at least one portion of the speech, and wherein a given representation is associated with the linguistic term.

10. The method of claim 9, further comprising:
determining a first vector that includes representations of the one or more speech sounds of the first voice, and a second vector that includes representations of the at least one portion of the speech of the second voice; and
determining a third vector that includes association probabilities between the first vector and the second vector, wherein the mapping is based on the third vector.

11. The method of claim 10, wherein determining the mapping comprises a linear regression that includes repeating the determining of the third vector and the mapping based on the third vector until convergence of the linear regression.

12. A method comprising:
receiving, by a device that includes one or more processors, data indicative of a plurality of speech sounds associated with first voice characteristics of a first voice;
receiving a request for provision of speech content, wherein the request is indicative of the speech content having second voice characteristics of a second voice;
determining, from within the plurality of speech sounds of the first voice, a sequence of speech sounds that corresponds to the speech content indicated by the request;
receiving a plurality of representations configured to associate the first voice characteristics with the second voice characteristics, wherein the plurality of representations are indicative of a comparison between the first voice characteristics and the second voice characteristics, and wherein the comparison includes a determined distortion representation that includes a frequency warping component and a frequency-weighting component determined simultaneously, wherein the frequency-warping component associates vocal tract characteristics of the first voice with corresponding vocal tract characteristics of the second voice, and wherein the frequency-weighting component associates voicing and nasal cavity characteristics of the first voice with corresponding voicing and corresponding nasal cavity characteristics of the second voice, wherein the plurality of representations are based on an indication of spectral distortion between a modified spectral representation of a first speech sound of the first voice and a spectral representation of a second speech sound of the second voice, and wherein the modified spectral representation is indicative of a pronunciation of the first speech sound according to the second voice characteristics;
modifying, based on the plurality of representations, the sequence of speech sounds of the first voice to have the second voice characteristics of the second voice; and
providing, based on the modification, the speech content having the second voice characteristics of the second voice.

13. The method of claim 12, further comprising:
determining, from within a plurality of linguistic terms, a sequence of linguistic terms that corresponds to the speech content indicated by the request, wherein the plurality of speech sounds of the first voice are associated with the plurality of linguistic terms, and wherein the plurality of linguistic terms include one or more of a phoneme or text, and wherein receiving the plurality of representations is based on an association between the plurality of linguistic terms and the plurality of representations.

14. The method of claim 12, wherein the vocal tract characteristics of the first voice and of the second voice are associated with one or more of a vocal tract length or a vocal tract shape.

15. The method of claim 12, further comprising:
determining one or more statistical models associated with the sequence of speech sounds of the first voice, wherein the one or more statistical models are indicative of the first voice characteristics; and
modifying, based on the plurality of representations, the one or more statistical models such that the one or more statistical models are indicative of the second voice characteristics, wherein modifying the sequence of speech sounds of the first voice is based on the modified one or more statistical models.

16. A device comprising:
one or more processors; and
data storage configured to store instructions executable by the one or more processors to cause the device to:
receive data indicative of a plurality of speech sounds associated with first voice characteristics of a first voice;
receive an input indicative of speech associated with second voice characteristics of a second voice;
map at least one portion of the speech of the second voice in real-time as the least one portion of the speech is received to one or more speech sounds of the plurality of speech sounds of the first voice;
based on the map, perform a comparison between the first voice characteristics with the second voice characteristics, wherein performing the comparison includes determining a distortion representation that includes a frequency warping component and a frequency-weighting component determined simultaneously, wherein the frequency-warping component associates vocal tract characteristics of the first voice with corresponding vocal tract characteristics of the second voice, and wherein the frequency-weighting component associates voicing and nasal cavity characteristics of the first voice with corresponding voicing and corresponding nasal cavity characteristics of the second voice;
determine, based on the comparison including the determined distortion representation, an indication of spectral distortion between a modified spectral representation of a first speech sound of the first voice and a spectral representation of a second speech sound of the second voice, wherein the modified spectral representation is indicative of a pronunciation of the first speech sound according to the second voice characteristics;
determine, based on the spectral distortion, a given representation configured to associate the first voice characteristics with the second voice characteristics; and
provide, based on the given representation, an output indicative of pronunciations of the one or more speech sounds of the first voice according to the second voice characteristics of the second voice.

17. The device of claim 16, wherein the instructions further cause the device to:
determine one or more statistical models associated with the one or more speech sounds of the first voice, wherein the one or more statistical models are indicative of the first voice characteristics; and
modify, based on the given representation, the one or more statistical models such that the one or more statistical models are indicative of the second voice characteristics, wherein providing the output is based on the modification of the one or more statistical models.

18. The device of claim 16, wherein the instructions further cause the device to:
receive a speech corpus that includes the plurality of speech sounds associated with the first voice characteristics, wherein receiving the data includes receiving the speech corpus; and
modify, based on the given representation, the speech corpus to include the one or more speech sounds associated with the second voice characteristics, wherein providing the output is based on the modified speech corpus.

\* \* \* \* \*